Figure 1:
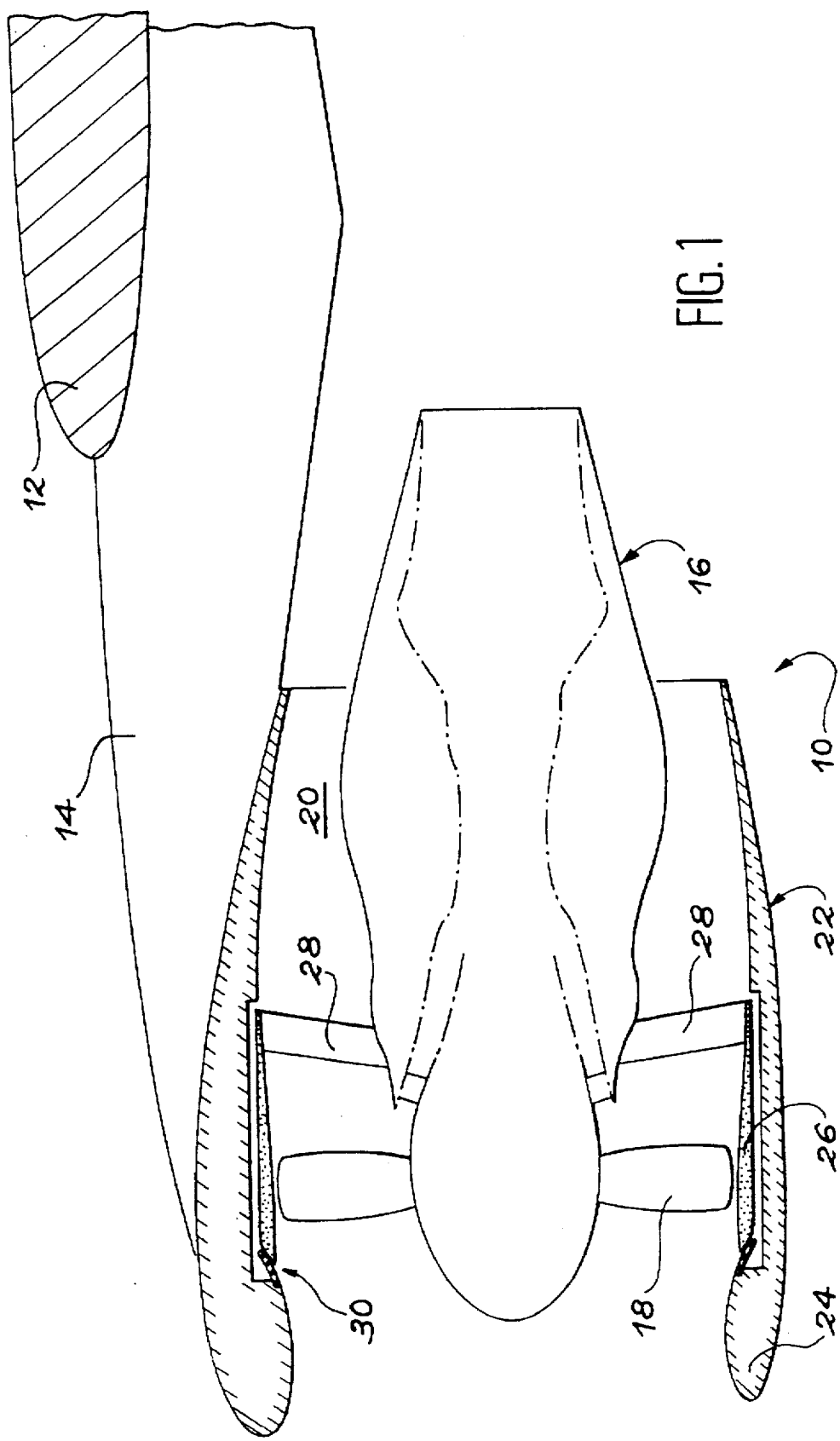

United States Patent [19]

Porte et al.

[11] Patent Number: 5,706,648
[45] Date of Patent: Jan. 13, 1998

[54] SEALING DEVICE BETWEEN AN AIR INLET AND A FAN FRAME OF A TURBOFAN ENGINE

[75] Inventors: Alain Porte, Colomiers; Hervé Marche, Roquettes, both of France

[73] Assignee: Aerospatiale Societe Nationale Industrielle, Paris, France

[21] Appl. No.: 595,670

[22] Filed: Feb. 2, 1996

[30] Foreign Application Priority Data

Feb. 3, 1995 [FR] France .................. 95 01272

[51] Int. Cl.$^6$ .................................................. F02K 3/02
[52] U.S. Cl. ........................ 60/226.1; 60/39.32; 244/54
[58] Field of Search ...................... 244/54, 53 R; 60/39.32, 226.1, 262; 415/135, 170.1, 174.1, 174.2

[56] References Cited

U.S. PATENT DOCUMENTS

| | | | |
|---|---|---|---|
| 3,463,498 | 8/1969 | Bill | 60/39.32 |
| 3,591,963 | 7/1971 | Kopp | 60/39.31 |
| 4,022,948 | 5/1977 | Smith et al. | 428/542 |
| 4,645,217 | 2/1987 | Honeycutt, Jr. et al. | 277/230 |
| 5,174,525 | 12/1992 | Schilling | 244/54 |
| 5,222,692 | 6/1993 | Glowacki | 244/53 R |
| 5,319,922 | 6/1994 | Brantley | 60/39.32 |

FOREIGN PATENT DOCUMENTS

| | | |
|---|---|---|
| 1452652 | 9/1966 | France . |
| 489653 | 6/1992 | France . |
| 1751550 | 12/1970 | Germany . |
| 722616 | 1/1955 | United Kingdom . |

Primary Examiner—Charles G. Freay
Attorney, Agent, or Firm—Michael N. Meller

[57] ABSTRACT

In a turbofan engine, particularly of the type in which the front end of the fan frame (26) is separate from the air inlet (24), the seal between the said two structures is provided by an elastic sleeve (32) fixed to the air inlet and fitted onto the front part of the fan frame. The diameter of the part of the sleeve before it is mounted onto the frame (26) is smaller than the external diameter of the front part of the latter. The sleeve (32) has an internal fitting preventing any relative circumferential displacement between the two ends thereof. An inflatable member (46) can be placed about that part of the sleeve which is fitted into the frame.

8 Claims, 2 Drawing Sheets

SEALING DEVICE BETWEEN AN AIR INLET AND A FAN FRAME OF A TURBOFAN ENGINE

The invention relates to a sealing device to be placed between an air inlet and a fan frame of a turbofan engine, particularly when these structures are subject to relative displacements, e.g. under the effect of aerodynamic and inertia loads applied to the engine during certain aircraft flight phases.

Such a device can be used on all turbofan engines equipping aircraft. Thus, although it is particularly suitable for the case where the air inlet is not directly fixed to the front of the fan frame, the sealing device according to the invention can also be used on engines in which such a direct fixing exists.

In a turbofan engine, the central part of the engine has, from the front to the rear, a compressor, a combustion chamber and a high pressure turbine driving the compressor. These different components are placed in a central frame also containing, behind the high pressure turbine, a low pressure turbine driving a fan placed in front of the compressor. The fan is installed in a fan frame connected to the central part of the engine by one or two sets of arms oriented radially with respect to the longitudinal axis of said central part. The fan creates a secondary air flow in an annular fan duct, defined between the central frame and a pod surrounding the central part of the engine over most of its length.

Starting from the front, the pod of a turbofan engine conventionally comprises a profiled box forming the engine air inlet, an intermediate part, whose inner envelope is formed on the fan frame and a rear part constituted by articulated cowls giving access to the central part of the engine. In general, the intermediate part of the pod also comprises articulate, external cowls giving access to equipments located in said intermediate part of the pod.

In most existing engines, the air inlet is fixed to the front of the fan frame by bolts, which pass through flanges formed on each of these structures.

However, there are certain engines in which the air inlet is separate from the fan frame, e.g. the central engine equipped DC10 and MD11 aircraft. It is also envisaged, in the case of engines suspended on a wing element by a strut, not to fix the air inlet to the fan frame, but instead directly to the strut.

When the structure of the air inlet is separate from the front end of the fan frame structure, relative displacements between these two structures are possible. In particular, the aerodynamic and inertia loads applied radially to the outer surface of the pod, particularly on aircraft landing and take-off, as well as during course changes, lead to displacements of the axis of the air inlet with respect to the axis of the fan frame. Said displacements occur in directions oriented radially relative to the axes of the two structures and which vary as a function of the nature of the loads applied to the pod. Consequently, a device ensuring the sealing, as well as the aerodynamic continuity within the pod must be provided between the two structures.

On existing central engines, in which the air inlet is separate from the fan frame, sealing is ensured by an elastomeric material joint, having a Ω-shaped cross-section and each of whose ends is respectively fixed to the air inlet and to the fan frame. A lipseal is fixed to the air inlet, within the Ω-shaped joint, so as to be in contact with the inner surface of the front end of the fan frame so as to ensure aerodynamic continuity within the pod.

However, this known solution suffers from various disadvantages. Firstly, the parts of the Ω-shaped joint located in a plane perpendicular to the relative displacement plane between the two structures are subject to wrinkling, which significantly reduces the service life of this joint.

Moreover, due to the fact that the Ω-shaped joint is fixed to two structures, it must be dismantled whenever the air inlet has to be removed, e.g. for replacing the engine. The aircraft downtime is then increased.

Finally, the sealing and aerodynamic continuity functions are ensured by two separate members, which increases the cost thereof.

The invention relates to a sealing device to be placed between an air inlet and a fan frame, on a turbofan engine, without relative displacements between the two structures leading to wrinkling liable to reduce the life of the device.

The invention also relates to a sealing device, whose removal is not necessary during an engine replacement, which reduces the aircraft downtime.

Finally, the invention also relates to a sealing device formed by a single member ensuring both the sealing and aerodynamic continuity within the pod.

According to the invention, this result is obtained by means of a sealing device between an air inlet and a turbofan engine fan frame, characterized in that it comprises an elastic sleeve, whereof a first end part is fixed to a first of the members constituted by the air inlet and the fan frame and whereof a second end part is fitted onto a part adjacent to the second member, so that the inoperative state diameter of the second end part of the sleeve is smaller than the external diameter of said adjacent part, a means to prevent wrinkling of the sleeve being provided so as to prevent a relative circumferential displacement between the two end parts of the sleeve.

In a preferred embodiment of the invention, the antiwrinkling means comprises a comb-shaped insert, embedded in the sleeve and having flexible leaves regularly distributed over the sleeve circumference, which are oriented in accordance with the sleeve generatrixes, and an annular shoulder carrying the flexible leaves and embedded in the first end part of the sleeve.

Advantageously, said comb-shaped insert is made from spring steel.

In certain embodiments of the invention, an inflatable member can be associated with the elastic sleeve around the second end of the latter.

Advantageously, the inflatable member is then integral with the sleeve, which permits the use of said member for increasing the diameter of the second end of the sleeve when it is wished to remove the engine.

In order that the pressure applied by the inflatable member to the second end of the sleeve is supplied directly by the fan, a passage can link said inflatable member with the engine fan duct, downstream of the fan.

In the preferred embodiment of the invention, the first end of the sleeve is fixed to the air inlet and the sleeve is made from elastomer.

A description is given hereinafter of a non-limitative embodiment with reference to the attached drawings, wherein show:

FIG. 1 A part sectional, side view very diagrammatically illustrating a turbofan engine equipped with a sealing device according to the invention.

Figure 2:
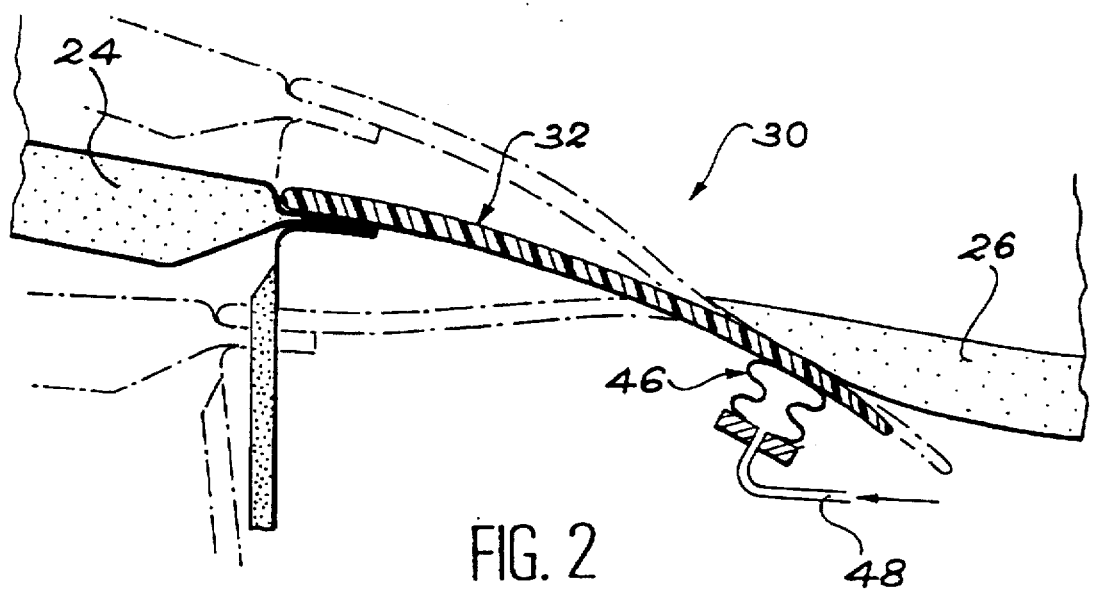

FIG. 2 A larger scale, cross-sectional view of the sealing device equipping the engine of FIG. 1.

Figure 3:
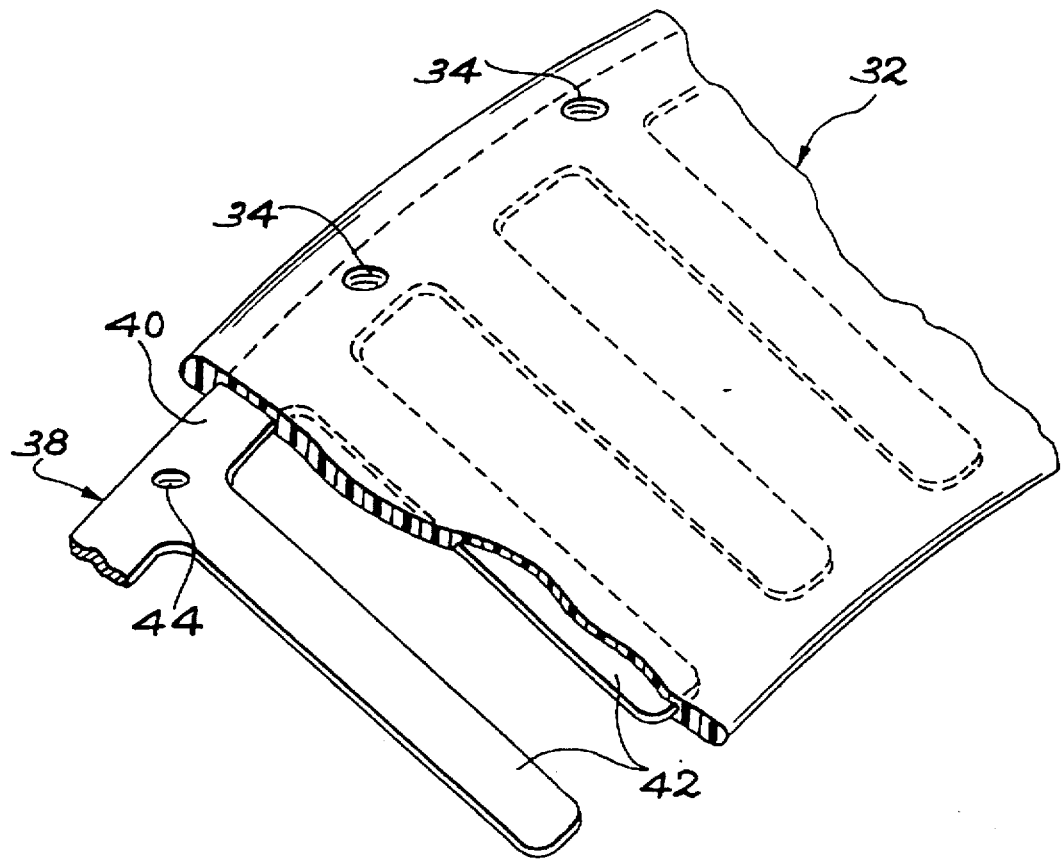

FIG. 3 A perspective view, partly torn away, of part of the elastic sleeve of the sealing device of FIG. 2.

FIG. 1 very diagrammatically shows a turbofan engine 10 suspended on a wing element 12 of an aircraft by a strut 14. The central part of the engine, designated in general terms by the reference 16, has a conventional structure. For reasons of clarification it is not illustrated in detail in FIG. 1. To facilitate understanding, it is simply pointed out that said central part 16 comprises, starting from the front, a compressor, a combustion chamber, a high pressure turbine and a low pressure turbine. The latter rotates a fan 18 placed at the front of the central part 16. The fan 18 creates a secondary air flow in the annular fan duct 20, defined between the central part 16 and a pod 22 coaxially surrounding said central part.

The front part of the pod 22 constitutes an air inlet 24, which channels the air flow entering the pod 22 towards the fan 18. To the rear of the air inlet 24, the inner envelope of the pod 22 is formed by the inner surface of a fan frame 26. This fan frame 26 surrounds the fan 18 so as to define between the ends of blades of the latter and the frame a clearance which is as small as possible. The fan frame 26 is connected to the non-rotating structures of the central part 16 of the engine by at least one series of arms 28 oriented radially with respect to the longitudinal axis of the reactor.

The rest of the structure of the pod 22 is not illustrated in detail in FIG. 1. It is simply pointed out that the outer envelope of the pod 22 is generally formed, around the fan frame 26, by two outer cowls directly articulated to the strut 14 and giving access to equipments installed in the intermediate part of the pod 22. In addition, the rear part of the pod 22 is generally formed by two C-shaped cowls, which are also articulated on the strut 14 and give access to the central part 16 of the engine.

As illustrated in FIG. 1, in preferred manner the invention is applied to turbofan engines in which there is no direct mechanical connection between the front end of the fan frame 26 and the air inlet 24. This situation in particular occurs when the complete pod 22 is directly supported by the strut 14, whilst the fan frame 26 is supported by the strut 14 through arms 28 and the non-rotating structure of the central part 16 of the engine 10.

Under these conditions, between the pod 22 and the fan frame 26, relative displacements can occur in directions oriented radially with respect to the longitudinal axis of the engine. Such displacements can in particular be caused by aerodynamic and inertia loads applied to the pod 22 during certain aircraft flight phases, such as landing, takeoff and course changes.

The taking into account of these relative displacements between the pod 22 and the fan frame 26 leads to the placing of a sealing device 30 in the fan duct 20, between the air inlet 24 and the front end of the fan frame 26. Apart from its sealing functions, said device 30 ensures the aerodynamic continuity of the inner envelope of the pod 22 in the region between the air inlet 24 and the fan frame 26.

According to the invention, use is made of a sealing device 30 having an original structure and which will now be described relative to FIGS. 2 and 3. This sealing device 30 comprises an elastic sleeve 32 made from an elastomeric material such as rubber and having, in section, a substantially linear shape when inoperative.

This elastic sleeve 32 is fixed at its front end to the air inlet 24 by not shown fixing means such as bolts, rivets, etc., regularly distributed over the entire sleeve circumference. These fixing means pass through holes 34 formed in the front part of the sleeve 32, as illustrated in FIG. 3. This fixing is such that the elastic sleeve 32 extends towards the rear the inner envelope of the air inlet 24, substantially without discontinuity, as can be seen in FIG. 2.

The elastic sleeve 32 extends rearwards beyond the front edge of the fan frame 26, so as to be fitted on a front part of said frame. More specifically, the diameter of the rear part of the elastic sleeve 32 before being mounted on the fan frame is smaller than the external diameter of the front part of the fan frame 26, so that said rear part of the sleeve 32 is permanently elastically applied to the outer surface of the front part of the frame 26.

As is shown in mixed line form in FIG. 2, the arrangement described hereinbefore enables the rear part of the sleeve 32 to remain permanently in tight contact with the fan frame 26, despite the relative displacements which may rise between the air inlet 24 and said frame 26. The sealing of the fan duct 20 and the aerodynamic continuity of the inner envelope of the pod are consequently preserved.

On more carefully studying the deformations of the sleeve 32 during relative displacements between the air inlet 24 and the fan frame 26, it can be seen that these deformations lead to a simple relative sliding between the sleeve and the outer surface of the fan frame in the vicinity of the relative displacement plane between the two structures, i.e. substantially in the plane of FIG. 2. However, in the plane perpendicular to said relative displacement plane, the sleeve is subject, in its plane, to shear forces which may bring about its wrinkling.

To obviate this disadvantage, according to the invention the sleeve 32 is provided with an anti-wrinkling means for preventing a relative circumferential displacement between the two ends of the sleeve at any point of its circumference.

In the embodiment more specifically illustrated in FIG. 3, said anti-wrinkling means comprises an insert 38 embedded in the elastic sleeve 32, which is essentially shaped like a comb. More specifically, it is formed from a spring leaf, e.g. of spring steel and has an annular shoulder 40, as well as flexible leaves 42.

The annular shoulder 40 is embedded in the front part of the sleeve 32 fixed in the air inlet 24 and extends over the entire circumference of the sleeve. As is shown in FIG. 3, the annular shoulder 40 is located in front of holes 34 by which the sleeve is fixed to the air inlet 24. Thus, in front of these holes 34, it has holes 44 for the passage of fixing means such as bolts or rivets, by which the sleeve is fixed to the air inlet.

The annular shoulder 40 carries flexible leaves 42 in such a way that the latter are regularly distributed over the entire sleeve circumference. The flexible leaves 42 are oriented according to generatrixes of the sleeve 32 and extend in the latter to the rear portion of the sleeve, which is fitted on the fan frame 26.

The presence of the insert 38 in the elastic sleeve 32 allows the bending of the latter in the relative displacement plane between the structures 24 and 26, as illustrated in FIG. 2. Conversely, the flexible leaves 42 prevent the rear part of the sleeve 32, which is received on the fan frame 26, to move circumferentially with respect to the front part of the sleeve 32, which is fixed to the air inlet 24, in the plane perpendicular to the aforementioned relative displacement plane. Any wrinkling of the sleeve 32 which bring about its tearing is consequently prevented. The life of the sealing device 30 is consequently significantly increased compared with a sleeve free from the insert 38.

The sealing device according to the invention also permits a removal of the air inlet 24, e.g. to replace an engine, without it being necessary to dismantle the elastic sleeve 32.

As is illustrated in broken line form in FIG. 2, the sealing device 30 according to the invention can also comprise an annular, inflatable member 46 placed around the rear part of the sleeve 32, which is received on the fan frame 26. More specifically, the inflatable member 46 is preferably integral with the rear part of the sleeve 32.

If necessary, the inflatable member 46 makes it possible to radially apply the rear part of the sleeve 32 to the fan frame 26 with an increased force, e.g. to ensure the maintaining of sealing in the case where the pressure gradient on either side of the sleeve is excessive. This pressurization of the inflatable member 46 can be obtained by linking it with the fan duct 20 (FIG. 1), downstream of the fan 18 using a passage 48.

It should be noted that the inflatable member 46 can also be used for provisionally expanding the rear end of the sleeve 32, during the fitting and removal of the air inlet 24. To this end, the inflatable member 46 can be connected by another, not shown passage to a vacuum source.

Obviously, the invention is not limited to the embodiment described hereinbefore, but instead covers all technical equivalents thereof. Thus, instead of being fixed to the air inlet and fitted onto the fan frame, the sleeve 32 could be fixed to the frame and fitted to a bulkhead extending rearwards the inner envelope of the air inlet.

I claim:

1. Sealing device between an air inlet and a fan frame of a turbofan engine, said device having an elastic sleeve, whereof a first end part is fixed to a first of the members constituted by the air inlet and the fan frame and whereof a second end is fitted on an adjacent part of the second member, so that the diameter of the second end part of the sleeve before being mounted onto the fan frame is smaller than the external diameter of the said adjacent part, a means for preventing wrinkling of the sleeve being provided to prevent any relative circumferential displacement between the two end parts of the sleeve.

2. Sealing device according to claim 1, wherein the anti-wrinkling means comprises a comb-shaped insert, embedded in the sleeve, having flexible leaves regularly distributed on the circumference of the sleeve and oriented in accordance with the sleeve generatrixes, and an annular shoulder carrying the flexible leaves and embedded in the first end part of the sleeve.

3. Sealing device according to claim 2, wherein the comb-shaped insert is made from spring steel.

4. Sealing device according to claim 1, comprising an inflatable member surrounding the second end part of the sleeve.

5. Sealing device according to claim 4, wherein the inflatable member is integral with the sleeve.

6. Sealing device according to claim 4, wherein the inflatable member communicates by a passage with an engine fan duct downstream of a fan.

7. Sealing device according to claim 1, wherein the first end part of the sleeve is fixed to the air inlet.

8. Sealing device according to claim 1, wherein the sleeve is made from elastomer.

* * * * *